United States Patent
Maiers

(12) 
(10) Patent No.: US 6,583,949 B2
(45) Date of Patent: Jun. 24, 2003

(54) DISC DRIVE BOTTOM MOUNTING THROUGH A SHIELD PLATE

(75) Inventor: Michael Alan Maiers, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 107 days.

(21) Appl. No.: 09/880,325

(22) Filed: Jun. 13, 2001

(65) Prior Publication Data

US 2002/0054453 A1 May 9, 2002

Related U.S. Application Data

(60) Provisional application No. 60/246,168, filed on Nov. 6, 2000.

(51) Int. Cl.[7] .......................... G11B 33/02; G11B 33/14; G06F 1/16
(52) U.S. Cl. ..................... 360/97.01; 361/685; 369/75.1
(58) Field of Search .......................... 360/97.01, 97.02; 369/75.1; 361/683, 684, 685; 248/638

(56) References Cited

U.S. PATENT DOCUMENTS

| | | | | |
|---|---|---|---|---|
| 5,502,604 A | * | 3/1996 | Furay | 360/97.01 |
| 5,535,092 A | * | 7/1996 | Bang | 361/685 |
| 5,654,875 A | * | 8/1997 | Lawson | 361/685 |
| 5,673,171 A | * | 9/1997 | Varghese et al. | 361/685 |
| 5,732,464 A | * | 3/1998 | Lamont | 29/825 |
| 5,777,821 A | * | 7/1998 | Pottebaum | 360/97.02 |
| 5,808,830 A | * | 9/1998 | Stefansky et al. | 360/97.01 |
| 6,078,498 A | * | 6/2000 | Eckerd et al. | 361/685 |
| 6,320,723 B1 | * | 11/2001 | Bernett | 360/97.02 |
| 2002/0057522 A1 | * | 5/2002 | Bernett et al. | 360/97.01 |

FOREIGN PATENT DOCUMENTS

| | | | | |
|---|---|---|---|---|
| JP | 03084792 A | * | 4/1991 | G11B/33/02 |
| JP | 06208785 A | * | 7/1994 | G11B/33/08 |
| JP | 10050043 A | * | 2/1998 | G11B/33/02 |
| JP | 10188526 A | * | 7/1998 | G11B/25/04 |
| JP | 2000003583 A | * | 1/2000 | G11B/33/02 |
| JP | 2000059042 A | * | 2/2000 | H05K/05/02 |

* cited by examiner

*Primary Examiner*—William Klimowicz
(74) *Attorney, Agent, or Firm*—Merchant & Gould P.C.

(57) ABSTRACT

A disc drive mounting assembly is disclosed for bottom mounting a disc drive to a mounting structure. The disc drive includes a baseplate having mounting rails, a shield plate, and a printed circuit board assembly positioned between the baseplate and the shield plate. The shield plate includes a mounting flange having a boss for receiving a mounting fastener. Each mounting rail includes a notch aligned with and receiving the mounting flange. The notch has a depth such that a clearance region is defined between the flange and the mounting rail to receive the boss. The clearance region also receives the end of a fastener extending through the boss. The notch has a solid base preventing a fastener from entering the base mounting rail and pulling the baseplate down relative to the shield plate to prevent compressing the printed circuit board assembly.

17 Claims, 5 Drawing Sheets

DISC DRIVE BOTTOM MOUNTING THROUGH A SHIELD PLATE

RELATED APPLICATIONS

This application claims priority of United States provisional application Serial No. 60/246,168 filed Nov. 6, 2000.

FIELD OF THE INVENTION

This application relates generally to computer disc drives and more particularly to bottom mounting through a protective shield.

BACKGROUND OF THE INVENTION

Disc drives are data storage devices that store digital data in magnetic form on a rotating storage medium on a disc. Modem disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer diameter of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

A majority of the disc drive's essential electronics are mounted on the printed circuit board assembly ("PCBA"). The PCBA is fastened to the bottom exterior surface of the drive and includes electrical components that manage the operations of the disc drive. For example, the PCBA includes electrical components that control the speed of the spindle and position of the actuator arms over the discs. Similarly, the PCBA also includes electrical components that interface with the computer's processor.

Seagate Technology, the assignee of the present invention, has installed a metal cover, or shield plate, over the PCBA to protect the board, and hence the disc drive's essential electronic circuitry, from electrostatic discharge. The cover also makes disc drive installation less time consuming and less likely to result in damage to the PCBA. However, it has been recognized that the ability of the electrical components on the PCBA to effectively dissipate heat generated during operation of the disc drive may be reduced for a number of reasons. One way to improve heat dissipation has been proposed by Bernett in the pending application entitled "Protective Cover for a Disc Drive Printed Circuit Board," Ser. No. 09/506,525, filed on Feb. 17, 2000 now U.S. Pat. No. 6,320,728B1. The Bernett application discloses a PCBA protective cover that acts as a heat sink.

However, recent changes in the construction of disc drives have adversely impacted the ability to use PCBA covers. To reduce the hard shock pulse resulting in a topple drop test, mounting rails are frequently made shorter. When the mounting rails are reduced in height, the shield plate is the lowest part when the disc drive is bottom mounted. The shield plate is typically constructed from sheet metal and provides a cushion in the topple drop test. While having the shield plate as the lowest part is desirable in the topple drop test, it has undesirable effects in normal operation when the disc drive is bottom mounted.

Typically, when a disc drive with normal (full) height mounting rails is fastened to the mounting structure, the screws are tightened until the bottom mounting rails become intimate with the mounting structure. However, for a disc drive that has the reduced height bottom mounting rails, the reduced height makes the PCBA protective cover the lowest part in the disc drive envelope. As a result when the disc drive is mounted onto the mounting structure, the PCBA protective cover comes into contact with the mounting structure first. When the screws are tightened to secure the disc drive to the mounting structure, a compressive force is delivered to the PCBA protective cover. Undesirably, the compressive force is transmitted to the PCBA and has a detrimental effect on the functioning of the PCBA components.

Accordingly there is a need for a mounting assembly that relieves the compressive force from the baseplate on the PCBA.

SUMMARY OF THE INVENTION

Embodiments of the present invention solve the above and other problems by including shield plate mounting means that is separate and independent from the disc drive mounting means. An embodiment of the present invention provides a method and assembly for bottom mounting a disc drive to a mounting structure whereby a compressive force is not applied to the PCBA between the baseplate and a bottom shield plate.

The mounting assembly includes a shield plate covering the printed circuit board assembly positioned below the baseplate. The shield plate includes disc drive mounting flanges, each flange having a boss for receiving a disc drive mounting fastener for fastening the disc drive to the mounting structure. The mounting assembly further includes a pair of mounting rails on opposite sides of the baseplate and extending downward from the baseplate. The printed circuit board assembly is sandwiched between the two mounting rails. Each mounting rail includes notches. Each notch is aligned with and receives one of the disc drive mounting flanges of the shield plate. The notch provides a clearance region over the boss. The notch can further provide a clearance region over the disc drive mounting fastener when the fastener is fully extended through the mounting structure and into or through the boss.

The mounting method includes fastening the shield plate onto the baseplate of the disc drive via recessed regions in the shield plate having shield mounting holes. Shield mounting fasteners pass through the shield plate and into the baseplate to secure the shield plate to the baseplate. The method further includes separately fastening the shield plate onto the mounting structure by passing disc drive mounting fasteners from the mounting structure into bosses formed in flanges extending laterally outward on the sides of the shield plate. The method includes aligning the flanges with notches in base rails of the baseplate, whereby the notches receive the ends of the disc drive mounting fasteners and the fasteners do not extend into the baseplate. The method avoids compression of the PCBA between the baseplate and the shield plate by providing separate shield mounting and disc drive mounting steps.

These and various other features as well as advantages will be apparent from a reading of the following detailed description and a review of the associated drawings.

DETAILED DESCRIPTION

Figure 1:
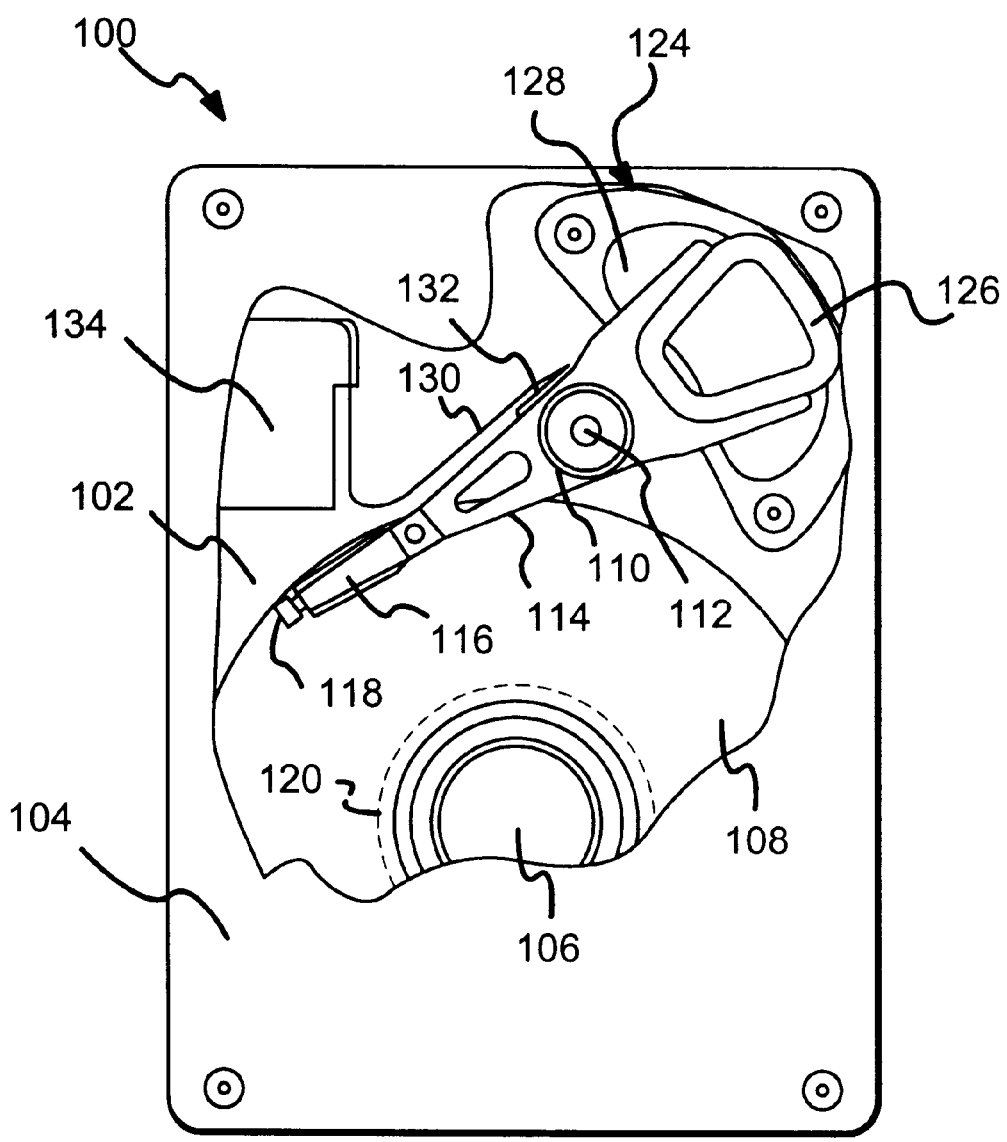
FIG. 1 is a plan view of a disc drive incorporating an exemplary embodiment of the present invention showing the primary internal components.

Embodiments of the invention are described in detail below with reference to the drawing figures. When referring to the figures, like structures and elements shown throughout are indicated with like reference numerals.

A disc drive 100 constructed in accordance with a preferred embodiment of the present invention is shown in FIG. 1. The disc drive 100 includes a baseplate 102 to which various components of the disc drive 100 are mounted. A top cover 104, shown partially cut away, cooperates with the baseplate 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 may include a plurality of actuator arms 114 which extend towards the discs 108, with one or more flexures 116 extending from each of the actuator arms 114. Mounted at the distal end of each of the flexures 116 is a transducer head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the baseplate 102 to a disc drive printed circuit board (not shown) mounted to the bottom side of the disc drive 100.

Figure 2:
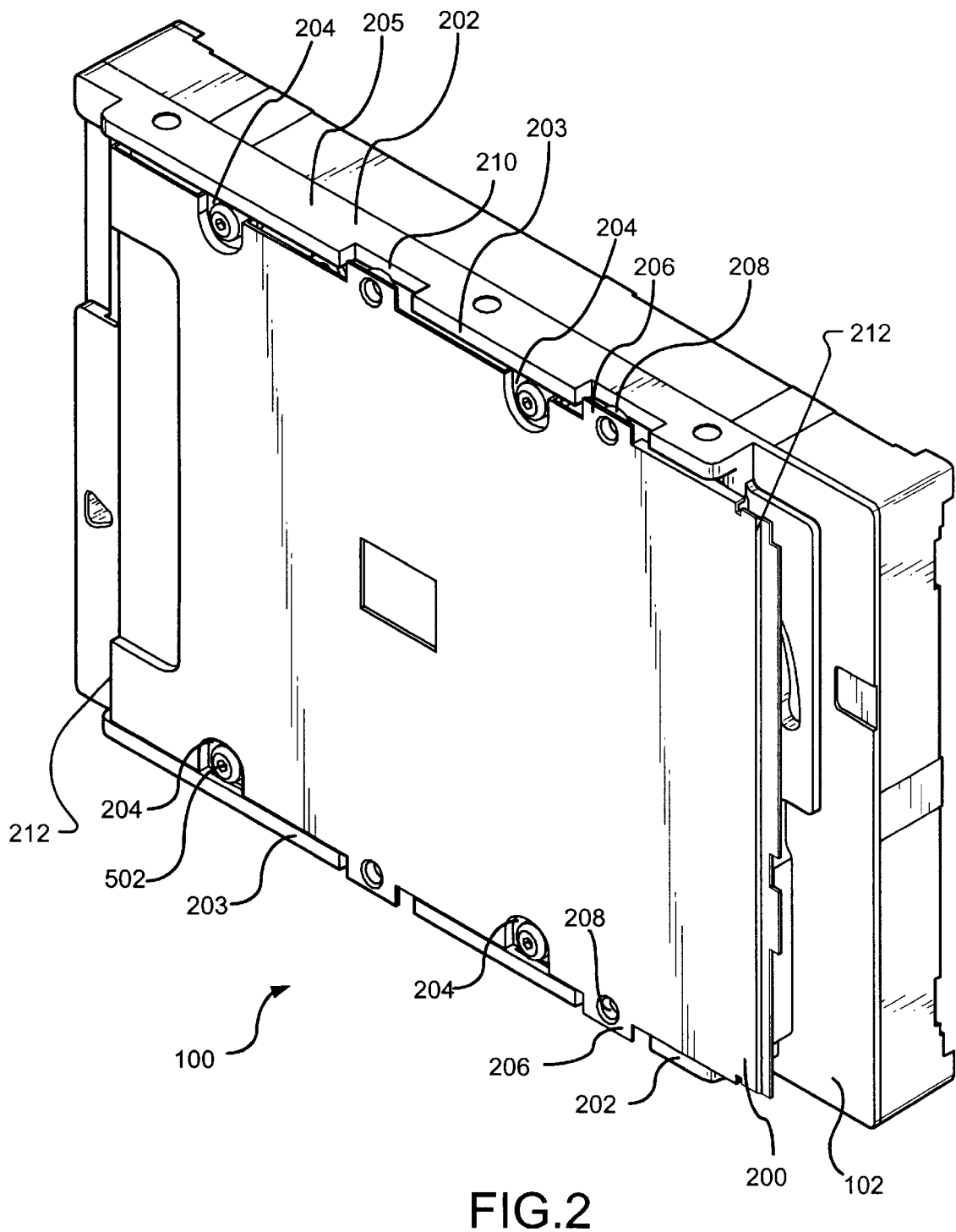
FIG. 2 is a perspective view of a disc drive incorporating an exemplary embodiment of the present invention.

FIG. 2 shows a perspective underside view of a disc drive incorporating an exemplary embodiment of the present invention. The baseplate 102 has two base mounting rails 202 extending downward from each side of the baseplate 102. The baseplate 102 and the baseplate mounting rails 202 define a recess (not shown) in which the printed circuit board assembly (PCBA) (300 of FIG. 3) is positioned. The recess is a void between the base mounting rails 202 and underneath the baseplate 102. The PCBA 300 containing the drive servo control circuitry is mounted onto the baseplate 102 below the baseplate 102 and between the base mounting rails 202. Each of the base mounting rails 202 has a bottom 203. Together, the bottoms 203 of the base mounting rails 202 define a plane running parallel to the baseplate 102. The base mounting rails 202 each have an external side 205 that defines a plane perpendicular to the baseplate 202. The planes defined by the sides 205 of the base mounting rails 202 enclose the disc drive 100.

A shield plate 200 is positioned between the rails 202 and is coupled to the baseplate 102 of the disc drive 100. The shield plate 200 is beneath the PCBA 300 and substantially covers and protects the PCBA 300. The shield plate 200 has a generally rectangular shape and is preferably constructed from sheet metal. In one embodiment the shield plate 200 has four shield mounting holes, or passages 204, for mounting the shield plate 200 to the baseplate 102. The shield mounting holes 204 are preferably recessed in indents in the shield plate 200 so that when the shield plate 200 is mounted on the baseplate 102 the head of the mounting fastener 502 does not protrude beyond the bottom planar surface of the shield plate 200. The shield mounting holes 204 are preferably, but not necessarily, spaced apart in pairs along opposite long sides of the shield plate 200. The baseplate 102 typically includes a complimentary passage (not shown) aligned with each shield mounting hole 204 for receiving the associated mounting fastener 502.

In another embodiment there are only two shield mounting holes 204 defined in the shield plate 200 for mounting the shield plate 200 to the baseplate 102. In this arrangement, the first shield mounting hole 204 is preferably positioned along one long side of the shield plate 200 between two ends 212 of the shield plate 200. The second shield mounting hole 204 is preferably positioned along the other long side of the shield plate 200 between the two ends 212 of the shield plate 200. Those skilled in the art will recognize that the shield mounting holes 204 may be positioned anywhere on the shield plate 200 such that they are each aligned with a complimentary passage (not shown) of the baseplate and such that the shield plate 200 is secured substantially parallel to the baseplate 102.

Figure 5:
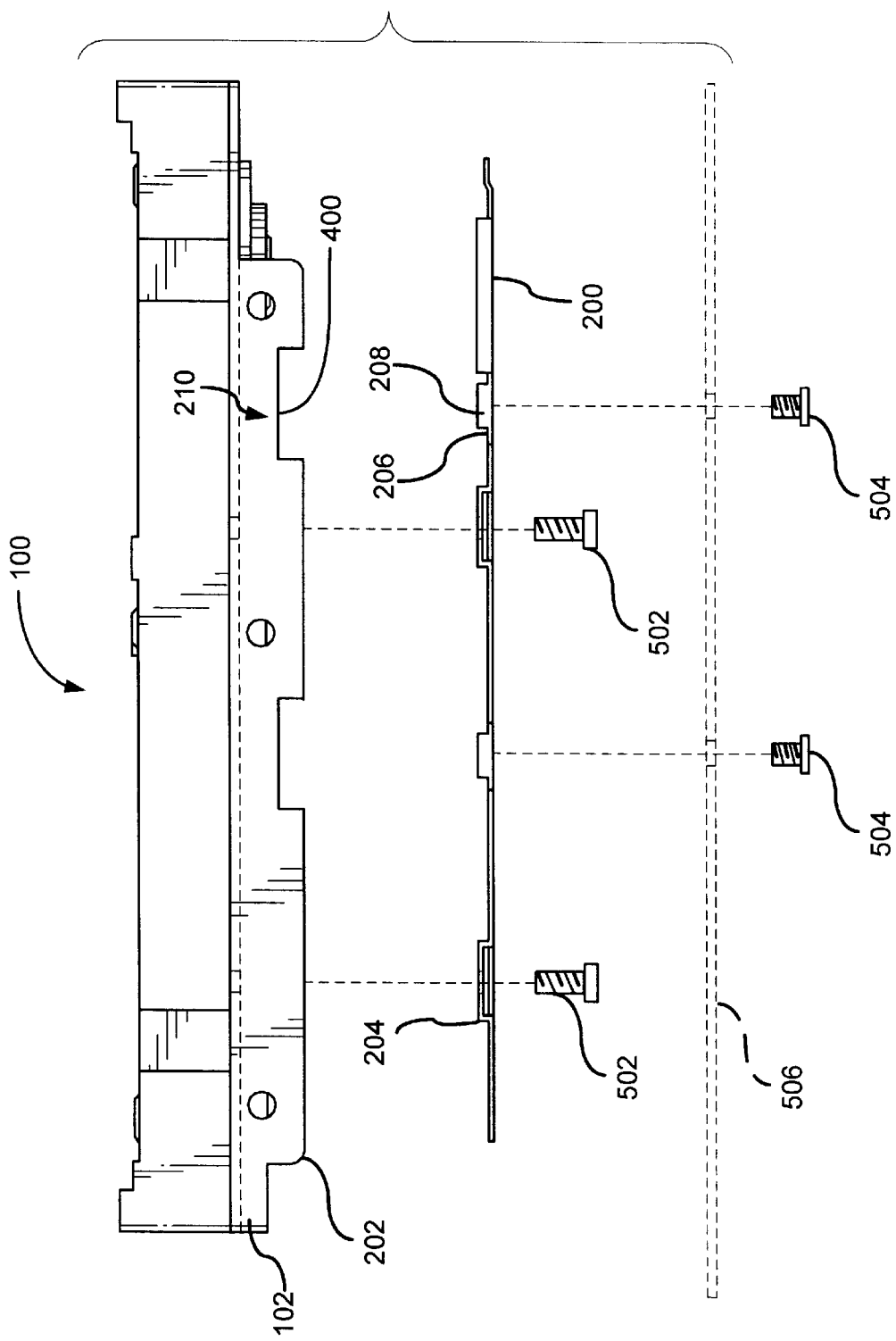
FIG. 5 is an exploded elevation view of a disc drive incorporating an exemplary embodiment of the present invention.

The shield plate 200 in the exemplary embodiment of FIG. 2 also has four disc drive mounting flanges 206. The disc drive mounting flanges are spaced apart in pairs along opposite long sides of the shield plate 200. Each disc drive mounting flange 206 has a threaded disc drive mounting boss 208 for receiving a fastener, such as a metal screw 504 (FIG. 5), that is used to attach the disc drive 100 to a mounting structure, such as a computer chassis 506 (FIG. 5). Each disc drive mounting flange 206 extends outward from the long side edge of the shield plate 200 and fits into a complementary rectangular notch 210 in one of the base mounting rails 202 of the baseplate 102. Each base mounting rail 202 has two complementary rectangular notches 210 along its bottom edge aligned with and receiving one of the disc drive mounting flanges 206. The rectangular notch 210 is a "cutout" in the lower portion of the base mounting rail 202 into which the disc drive mounting flange 206 can fit. As will be discussed in more detail with reference to the embodiment of FIG. 5, the depth of the complementary rectangular notch 210 provides clearance between the base mounting rail 202 and a fastener 504 (FIG. 5) extending through the mounting structure 506 (FIG. 5) into the threaded disc drive mounting boss 208 of the disc drive mounting flange 206.

In the embodiment of FIG. 2, the disc drive mounting flanges 206 and the shield mounting holes 204 are alternating along a long side edge of the shield plate 200. The disc drive mounting flanges 206 used to connect the disc drive 100 to the mounting structure 506 are separate and independent from the shield mounting holes 204 used to couple the shield plate 200 to the baseplate 102. The disc drive 100 is mounted to the mounting structure 506 (FIG. 5) with disc drive mounting fasteners, such as metal screws 504 (FIG. 5). The disc drive mounting fasteners 504 extend through the mounting structure 506 and into the threaded disc drive mounting boss 208 of the disc drive mounting flange 206 to secure the disc drive 100 to the mounting structure 506. The disc drive mounting fasteners 504 do not extend into the baseplate 102 or the base mounting rails 202. Since there are two separate sets of fasteners and corresponding sets of receiving apertures, one set for attaching the shield plate 200 to the baseplate and another set for independently attaching the disc drive 100 to the mounting structure, the baseplate 102 is not pulled against the shield plate 200. As a result, compression of the printed circuit board assembly (PCBA) 300 is prevented. Other embodiments of the invention are possible.

Figure 3:
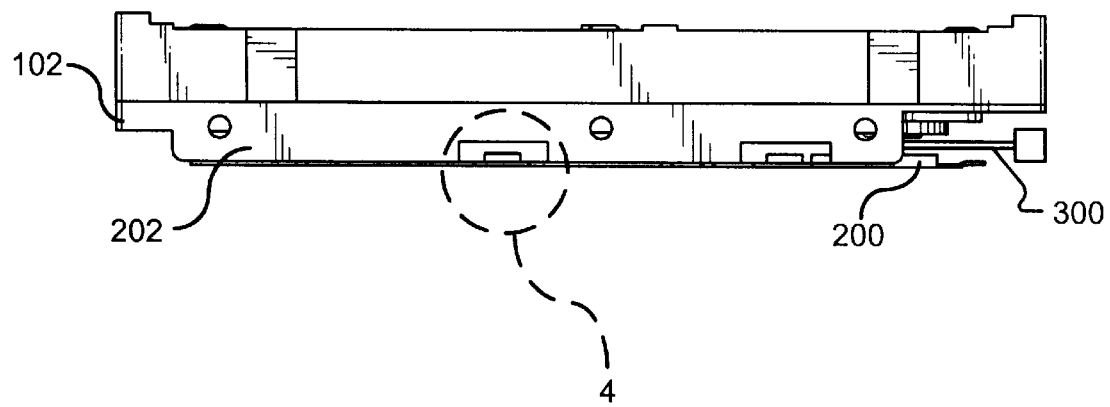
FIG. 3 is an elevation view of a disc drive incorporating an exemplary embodiment of the present invention.

FIG. 3 shows an elevation view of a disc drive incorporating an exemplary embodiment of the present invention. The shield plate 200 shown in FIG. 3 is below the base mounting rails 202 so that when the disc drive 100 is bottom mounted to a mounting structure, the shield plate 200 comes into contact with the mounting structure first. As discussed earlier, the printed circuit board assembly (PCBA) 300 is positioned between the baseplate 102 and the shield plate 200. To avoid applying a compressive force to the PCBA, it is desirable for the lowest part of the disc drive 100 to be the attachment point and for only the lowest part to be attached to the mounting structure. In a design such as this, where the shield plate 200 comes into contact with the mounting structure first, the shield plate 200 provides the attachment point. In one embodiment, the shield plate 200 is connected to the baseplate 102 before the disc drive 100 is secured to the mounting structure. Fasteners secure the shield plate 200 to the mounting structure by extending through the disc drive mounting flange 206, which is positioned in the complementary rectangular notch 210 of the base mounting rail 202.

Figure 4:
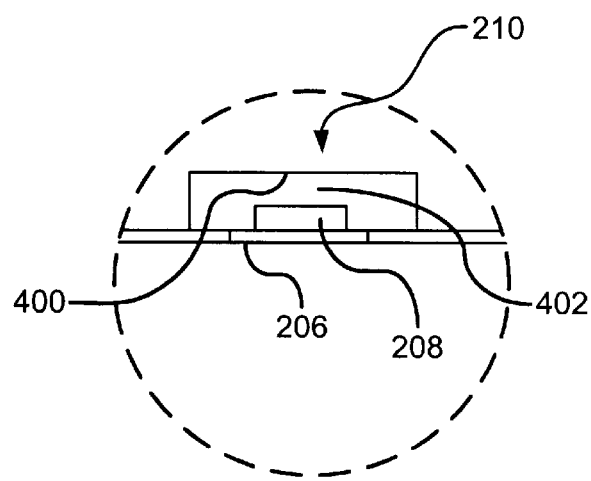
FIG. 4 is an enlarged detail view of an exemplary embodiment of the present invention.

FIG. 4 depicts an enlarged view of a complementary rectangular notch 210 with a disc drive mounting flange 206 of the shield plate 200. The rectangular notch 210 includes a solid base 400 and a clearance region 402. The solid base 400 is a section of the base mounting rail 202 extending parallel to the shield 200 having a width sufficient to receive the disc drive mounting flange 206. The solid base 400 has no hole for receiving a fastener, so that a disc drive mounting fastener 504 (FIG. 5) does not enter the base mounting rail 202. Consequently, the disc drive mounting fastener 504 does not pull the baseplate 102 down onto the PCBA positioned between the baseplate 102 and the shield plate 200. The clearance region 402 is a void into which the threaded disc drive mounting boss 208 and the end of the disc drive mounting fastener 504 may extend. When the disc drive mounting fastener 504 is fully inserted through the mounting structure 506 and into the threaded disc drive mounting boss 208, the disc drive mounting fastener 504 will not touch the solid base 400 of the rectangular notch 210.

FIG. 5 illustrates an exploded elevation view of a disc drive incorporating an exemplary embodiment of the present invention. In one embodiment, the baseplate 102 with base mounting rails 202 is first secured to the shield plate 200 with shield mounting fasteners, such as shield mounting screws 502. The shield mounting fasteners 502 are attached to the baseplate 102 through shield mounting holes 204. The shield mounting holes 204 are clearance holes for receiving the shield mounting fasteners 502 which thread into the baseplate 102. The shield mounting holes 204 are preferably recessed in indents in the shield plate 200 so that the heads of the shield mounting fasteners 502 do not project below the plane defined by the shield plate 200. The shield mounting fasteners 502 provide the only mechanism for attaching the shield plate 200 to the baseplate 102.

After the shield plate 200 is secured to the baseplate 102, the disc drive 100 is mounted to a mounting structure 506. The mounting structure 506 can be any rigid planar surface parallel to the baseplate 102 for attaching the disc drive 100 thereto. One example of a mounting structure 506 is the bottom inner surface of a computer chassis. The mounting structure 506 has four base mounting apertures for mounting the disc drive 100 to the mounting structure 506. The disc drive 100 is mounted to the mounting structure 506 by first positioning the disc drive 100, with the shield plate 200 attached, on the mounting structure 506 so that the four threaded disc drive mounting bosses 208 in the disc drive mounting flanges 206 are aligned with the mounting structure apertures. Subsequently, a disc drive mounting fastener 504 is extended through the mounting structure 506 and into one of the four aligned threaded disc drive mounting bosses 208 of a disc drive mounting flanges 206. The end of each of the shield mounting fasteners 504 may project beyond the top of the complementary disc drive mounting boss 208.

In one embodiment, when the disc drive is bottom mounted to the mounting structure 506, the depth of the notch 210 is such that clearance (see 402 in FIG. 4) exists between the end of the fastener 504 and the solid base 400 when the fastener is fully inserted through the mounting structure 506 and into the disc drive mounting flange 206. In another embodiment, the end of the fastener 502 will not touch the solid base 400 of the notch 210 when the fastener 502 is fully inserted, and does not extend into the base mounting rail 202, and does not push against the base mounting rail 202. The shield plate 200 is secured to the base mounting rails 202 via the shield mounting holes 204 and the disc drive 100 is secured to the mounting structure 506 separately and independently via the mounting flanges 206. No fastener creates a direct connection between the base mounting rails 202 and the mounting structure 506. As a result, compression of the disc drive components between the shield plate 200 and the baseplate 102 is avoided.

Figure 6:
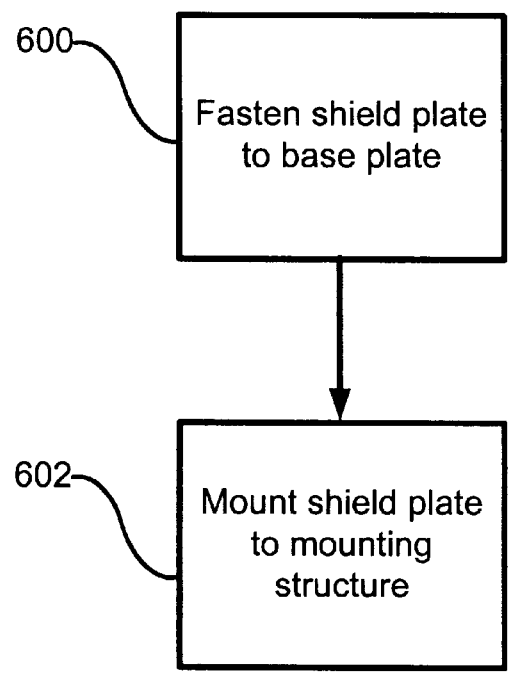
FIG. 6 is a flow control diagram illustrating method steps in an embodiment of the present invention.

FIG. 6 is a flow control diagram illustrating method steps in an embodiment of the present invention. The method steps are employed in the manufacturing and/or installation processes to mount a disc drive having a protective shield plate to a mounting structure. In a fastening operation 600, a shield plate is fastened onto the baseplate of the disc drive. Preferably, the shield plate includes shield mounting holes through which shield mounting fasteners are extended to affix the shield plate to the baseplate. The shield plate is fastened substantially parallel to the baseplate. The disc drive printed circuit board assembly (PCBA) 300 is disposed between the baseplate and the shield plate. As discussed, the shield plate protects the PCBA 300 and can absorb heat. The shield plate includes two disc drive mounting flanges, or tabs, extending out from each of the long sides of the shield plate. Preferably, the baseplate includes base mounting rails having complimentary notches, or slots for receiving the disc drive mounting flanges.

After the fastening operation 600 is performed, a mounting operation 602 is performed. The mounting operation 602 is typically performed during the computer manufacturing or disc drive installation process. The mounting operation 602 includes separately fastening the shield plate onto a mounting structure. Preferably, the mounting operation 602 includes screwing a disc drive mounting fastener, such as a metal screw, through a whole in the mounting structure into a boss formed in a flange of the shield plate. The boss defines a passage through which the disc drive mounting fastener passes to secure the shield plate to the mounting structure. When the shield plate is fastened to the mounting structure the disc drive is coupled to the mounting structure. Preferably, the disc drive mounting fastener is received by a complimentary notch in a base mounting rail connected to the baseplate. In this embodiment, the disc drive mounting fastener will not touch the base rail, and does not extend into it. Thus, the base rail, and the baseplate, are not pulled down toward the PCBA. Beneficially, the PCBA is not compressed between the baseplate and the shield plate.

To summarize, an embodiment can be viewed as a method of mounting (such as 602) a disc drive (such as 100) to a mounting structure (such as 506). The embodiment involves fastening (such as 600) a protective shield plate (such as 200) onto the baseplate (such as 102) of the disc drive (such as 100). The step of fastening involves extending a shield mounting fastener (such as 502) through a shield mounting hole of the mounting structure (such as 506) and into the baseplate (such as 102). The method further includes separately fastening (such as 602) the shield plate (such as 200) onto the mounting structure (such as 506) by passing a disc drive mounting fastener (such as 504) through the mounting structure (such as 506) and into a disc drive mounting boss (such as 208) formed in a flange (such as 206) of the shield plate (such as 200).

Another embodiment can be viewed as disc drive bottom mounting assembly for mounting a disc drive (such as 100) to a mounting structure (such as 506). The disc drive (such as 100) has a baseplate (such as 102) with a bottom planar surface and a cover (such as 104) housing a printed circuit board assembly (such as 300) fastened to the baseplate (such as 102). The mounting assembly includes a pair of mounting rails (such as 202) that extend downward from the baseplate (such as 102) and define a recess underneath the baseplate (such as 102) between the mounting rails (such as 202). The printed circuit board assembly (such as 300) is positioned in the recess and mounted to the baseplate (such as 102). The embodiment includes a shield plate (such as 200) substantially covering the printed circuit board assembly (such as 300). The shield plate (such as 200) is mounted to the baseplate (such as 102) and is separately fastened to the mounting structure (such as 506).

Additionally, the shield plate (such as 200) can include four disc drive mounting flanges (such as 206) with two flanges (such as 206) extending laterally out from each side of the shield plate (such as 200). Each flange (such as 206) defines a disc drive mounting passage (such as 208) for receiving a disc drive mounting fastener (such as 504). Each flange may include a boss (such as 208) for receiving the disc drive mounting fastener (such as 504). Further, the mounting rails (such as 202) may each include two complimentary notches (such as 210). Each notch (such as 210) is aligned with and receives one of the flanges (such as 206). Each complimentary notch (such as 210) defines a clearance region (such as 402) for receiving the boss (such as 208) on the associated flange (such as 206).

Furthermore, another embodiment can be viewed as a disc drive mounting assembly for bottom mounting a disc drive (such as 100) to a mounting structure that includes a shield plate (such as 200) mounted to the baseplate (such as 102) between the mounting rails (such as 202). The embodiment may further include a disc drive mounting flange (such as 206) for mounting the disc drive (such as 100) to a mounting structure (such as 506). The disc drive mounting flange (such as 206) includes a passage (such as 208) for receiving a disc drive mounting fastener (such as 504). Additionally, a clearance region (such as 402) may exist between the disc drive mounting flange (such as 206) and the base mounting rail (such as 202) so that the baseplate (such as 102) is not pulled down relative to the shield plate (such as 200).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous changes may be made which will readily suggest themselves to those skilled in the art and which are encompassed in the spirit of the invention disclosed and as defined in the appended claims.

What is claimed is:

1. A method of mounting a disc drive to a mounting structure, the disc drive having a baseplate having two base mounting rails extending from opposite sides of the baseplate, a printed circuit board assembly positioned between the rails under the baseplate, and a shield plate between the rails beneath the printed circuit board assembly, the shield plate having a mounting hole therethrough, the method comprising steps of:

(a) fastening the shield plate onto the baseplate of the disc drive by extending a shield mounting fastener through the shield mounting hole and into the baseplate; and (b) separately fastening the shield plate onto the mounting structure by passing a disc drive mounting fastener from the mounting structure into a disc drive mounting boss formed in the shield plate.

2. The method of claim 1 wherein the mounting boss is formed in a laterally extending mounting flange projecting from a side edge of the shield plate and the fastening step (b) comprises a step of:

(b)(i) inserting the disc drive mounting fastener through the mounting structure and into the mounting flange of the shield plate so that there is a clearance region between the mounting flange and the base mounting rail to prevent compressing of the printed circuit board assembly between the shield plate and the baseplate.

3. A disc drive mounting assembly for mounting a disc drive to a mounting structure wherein the disc drive has a baseplate having a bottom planar surface and a cover housing a printed circuit board assembly fastened to the baseplate, the mounting assembly comprising:

a pair of mounting rails extending downward from the baseplate defining a recess underneath the bottom planar surface and between the mounting rails wherein the printed circuit board is positioned and mounted to the baseplate; and a shield plate substantially covering the printed circuit board assembly, mounted to the baseplate, and separately fastened to the mounting structure.

4. The disc drive mounting assembly of claim 3 wherein the shield plate includes four disc drive mounting flanges, two flanges extending laterally out from each side of the shield plate, each flange defining a disc drive mounting passage for receiving a disc drive mounting fastener.

5. The disc drive mounting assembly of claim 4 wherein each flange includes a boss having a passage for receiving the disc drive mounting fastener.

6. The disc drive mounting assembly of claim 5 wherein the mounting rails each include two complimentary notches, each notch aligned with and receiving one of the flanges, wherein each complimentary notch defines a clearance region for receiving the boss on the associated flange.

7. The disc drive mounting assembly of claim 6 wherein the notch further provides a clearance region for receiving the disc drive mounting fastener.

8. The disc drive mounting assembly of claim 4 wherein the shield plate includes two recessed regions, each recessed region defining a shield mounting passage for mounting the shield plate onto the baseplate, the shield mounting passages being separate from the disc drive mounting passages.

9. The disc drive mounting assembly of claim 8 wherein the shield plate has an outer planar surface and each of the shield mounting passages is defined in a recess of the shield plate, the recess receiving a head of the fastener so that the head does not protrude beyond the outer planar surface.

10. The disc drive mounting assembly of claim 4 wherein the shield plate has four recessed regions, each recessed region defining a shield mounting passage for mounting the shield plate onto the baseplate, the shield mounting passages being separate from the disc drive mounting passages.

11. A disc drive mounting assembly for bottom mounting a disc drive to a mounting structure comprising:

a disc drive having a baseplate, two base mounting rails extending from opposite sides of the baseplate, a shield plate beneath the baseplate and between the rails, and a printed circuit board assembly positioned between the baseplate and the shield plate; and a disc drive mounting means for receiving a disc drive mounting fastener and preventing the baseplate from being pulled down relative to the shield plate.

12. The disc drive mounting assembly of claim 11 wherein the disc drive mounting means comprises a disc drive mounting flange having a passage for receiving the disc drive mounting fastener extending through the mounting structure and into the passage, wherein a clearance region is defined between the disc drive mounting flange and the base mounting rail.

13. The disc drive mounting assembly of claim 12 wherein the passage is threaded.

14. The disc drive mounting assembly of claim 12 wherein the disc drive mounting flange further includes a boss for receiving the disc drive mounting fastener.

15. The disc drive mounting assembly of claim 12 wherein the mounting rails each have complimentary notches, each notch aligned with and receiving one of the disc drive mounting flanges, wherein each complimentary notch defines the clearance region.

16. The disc drive mounting assembly of claim 11 further comprising a shield mounting means on the shield plate for mounting the shield plate to the baseplate, wherein the shield mounting means is independent of the disc drive mounting means.

17. The disc drive mounting assembly of claim 16 wherein the shield mounting means comprises a recessed shield mounting boss having a hole for receiving a shield mounting fastener extending through the shield plate and attaching to the baseplate.

* * * * *